(12) United States Patent
Lougheed

(10) Patent No.: US 11,212,002 B1
(45) Date of Patent: Dec. 28, 2021

(54) METHOD AND APPARATUS FOR COMMUNICATIONS WITHIN A TOROIDAL OPTICAL SLIP RING

(71) Applicant: General Dynamics Land Systems—Canada Corporation, Ottawa (CA)

(72) Inventor: James Lougheed, Ottawa (CA)

(73) Assignee: GENERAL DYNAMICS LAND SYSTEMS—CANADA CORPORATION, Ottawa (CA)

(*) Notice: Subject to any disclaimer, the term of this patent is extended or adjusted under 35 U.S.C. 154(b) by 0 days.

(21) Appl. No.: 16/947,700

(22) Filed: Aug. 13, 2020

(51) Int. Cl.
| | |
|---|---|
| *H04B 10/00* | (2013.01) |
| *H04B 10/114* | (2013.01) |
| *H04B 10/60* | (2013.01) |
| *H04B 10/524* | (2013.01) |
| *H02K 13/00* | (2006.01) |
| *F41A 23/24* | (2006.01) |
| *H04B 10/50* | (2013.01) |
| *H04B 10/80* | (2013.01) |

(52) U.S. Cl.
CPC .......... *H04B 10/114* (2013.01); *F41A 23/24* (2013.01); *H02K 13/003* (2013.01); *H04B 10/502* (2013.01); *H04B 10/524* (2013.01); *H04B 10/60* (2013.01); *H04B 10/808* (2013.01)

(58) Field of Classification Search
CPC .............. H04B 10/112; H04B 10/1123; H04B 10/1125; H04B 10/114; H04B 10/1143; H04B 10/1149; H04B 10/40; H04B 10/116; G02B 6/3604; G02B 6/262; G02B 6/32; G02B 6/264
USPC ....... 398/118, 119, 127, 128, 130, 124, 129, 398/131, 172, 182, 189, 183, 135, 136, 398/202, 208, 164; 385/25, 26
See application file for complete search history.

(56) References Cited

U.S. PATENT DOCUMENTS

| | | | |
|---|---|---|---|
| 6,717,312 B1* | 4/2004 | Kaplan | H02K 7/088 310/254.1 |
| 8,488,971 B2* | 7/2013 | Linnartz | H04B 10/1149 398/118 |
| 10,054,746 B2* | 8/2018 | Rollinger | H04B 10/2589 |
| 2012/0237198 A1* | 9/2012 | Bowman | G02B 6/4202 398/1 |

* cited by examiner

*Primary Examiner* — Hanh Phan
(74) *Attorney, Agent, or Firm* — LKGlobal | Lorenz & Kopf, LLP

(57) ABSTRACT

The present application relates to a method and apparatus for transmitting a data signal between a stator ring and a rotor ring including generating, by a transmitter, a transmission signal in response to receiving the data signal, transmitting, by a plurality of optical transmitters coupled to an inner surface of the stator ring, the transmission signal to a plurality of detectors coupled to an outer surface of the rotor and wherein the optical transmitters are configured to transmit the transmission signal towards a focus of the stator ring, summing a plurality of representations of the transmission signal received by each of the plurality of detectors to generate a summed transmission signal, and extracting, by a receiver, the data signal from the summed transmission signal.

19 Claims, 5 Drawing Sheets

100

METHOD AND APPARATUS FOR COMMUNICATIONS WITHIN A TOROIDAL OPTICAL SLIP RING

BACKGROUND

The present disclosure relates generally to optical transmission of data between two moving objects. More specifically, aspects of this disclosure relate to systems, methods and devices for providing a robust optical communications channel between an outer toroidal ring and an inner toroidal ring wherein one of the toroidal rings is rotationally movable with respect to the other toroidal ring.

Reliable communications between a fixed object and a movable object have often proved challenging. This is particularly problematic in a structure where an outer portion of the structure rotates around an inner portion of the structure and line of site connections between the two portions are continuously disrupted. For example, an armored vehicle turret typically includes a majority of the vehicles weapons, communications and sensor systems, but is required to freely rotate with respect to the vehicle hull, or body. Systems within the vehicle hull provide power to the systems within the vehicle turret and digital communications must be enabled between the turret and the hull. Typically, this electrical power and other digital signals is conducted through a slip ring assembly mounted on the rotational axis below the turret basket. This assembly may include insulated electrical brushes mounted circularly around a set of insulated rings that rotate with the vehicle turret. This assembly includes bearings, springs, seals and other components and is therefore elaborate & expensive.

As the complexity of computer-controlled systems, data capture, and automation increases, the amount of data required to be transmitted across this freely moving rotational interface increases. Improvements in electronically controlled vehicle drive systems, vehicle electronics, sensors, defense systems, displays and video exchanged between turret & hull have significantly increased the amount of digital communication between the current rotor and stator system, adding to the already substantial information transmitted between the vehicle hull and turret rendering the current systems insufficient, with low bandwidth and limited space for more contacts. It would be desirable to overcome these problems and provide a robust and cost effective system for enabling high bandwidth communications between an inner rotational surface and an outer rotational surface.

The above information disclosed in this background section is only for enhancement of understanding of the background of the invention and therefore it may contain information that does not form the prior art that is already known in this country to a person of ordinary skill in the art.

SUMMARY

Disclosed herein are short range communications systems and related systems and methods for provisioning short range communications systems, methods for making and methods for operating such systems, and vehicles equipped with onboard inter vehicle communications networks and systems. By way of example, and not limitation, there is presented an armored vehicle having a hull and a turret where a plurality of optical communications links are provided within a toroidal drive structure having an first portion rigidly affixed to the hull for rotating the turret and a second portion rigidly affixed to the turret.

In accordance with an aspect of the present invention, a communications system including an outer ring oriented in a first plane having an inner surface, an inner ring oriented in the first plane having an outer surface and positioned within the outer ring such that the inner surface and the outer surface are separated by a gap, a plurality of optical transmitters disposed on the inner surface, the plurality of transmitters oriented parallel to the first plane to transmit a transmission signal across the gap toward a focus of the outer ring, a plurality of detectors disposed on the outer surface, the plurality of detectors oriented parallel to the first plane to receive the transmission signal transmitted across the gap toward a focus of the inner ring and to generate a plurality of representations of the transmission signal, a transmitter configured to receive a data signal, to modulate the data signal to generate the transmission signal and to couple the transmission signal to the plurality of optical transmitters, a summer configured to sum the plurality of representations of the transmission signal from each of the plurality of detectors and generate a summed transmission signal in response to the sum the plurality of representations of the transmission signals, and a receiver operative to extract the data signal from the summed transmission signal and to couple the data signal to a data processing device.

In accordance with another aspect of the present invention, a method for transmitting a data signal between a stator ring and a rotor ring including generating, by a transmitter, a transmission signal in response to receiving the data signal, transmitting, by a plurality of optical transmitters coupled to an inner surface of the stator ring, the transmission signal to a plurality of detectors coupled to an outer surface of the rotor and wherein the optical transmitters are configured to transmit the transmission signal towards a focus of the stator ring, summing a plurality of representations of the transmission signal received by each of the plurality of detectors to generate a summed transmission signal, and extracting, by a receiver, the data signal from the summed transmission signal.

In accordance with another aspect of the present invention, a communications system for transmitting a data between a turret and a hull including an outer ring having an inner surface, an inner ring having an outer surface wherein the inner ring is positioned within the outer ring and wherein the inner surface and the outer surface are separated by an air gap, a plurality of optical transmitters disposed on the outer surface wherein each of the plurality of optical transmitters is oriented to have a beam width centered away from the focus of the inner ring, the plurality of optical transmitters further configured to transmit a transmission signal towards the inner surface, plurality of detectors disposed on the inner surface wherein each of the plurality of detectors is oriented to have a beam width centered away from the focus of the outer ring wherein each of the plurality of detectors is configured to receive one of a plurality of representations of the transmission signal, a transmitter coupled in series to the plurality of optical transmitters, the transmitter being further operative to generate a transmission signal in response to the data, a summer configured for generating a summed transmission signal in response to the plurality of representations of the transmission signal, and a receiver configured for extracting the data from the summed transmission signal and coupling the data to a vehicle data processor.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
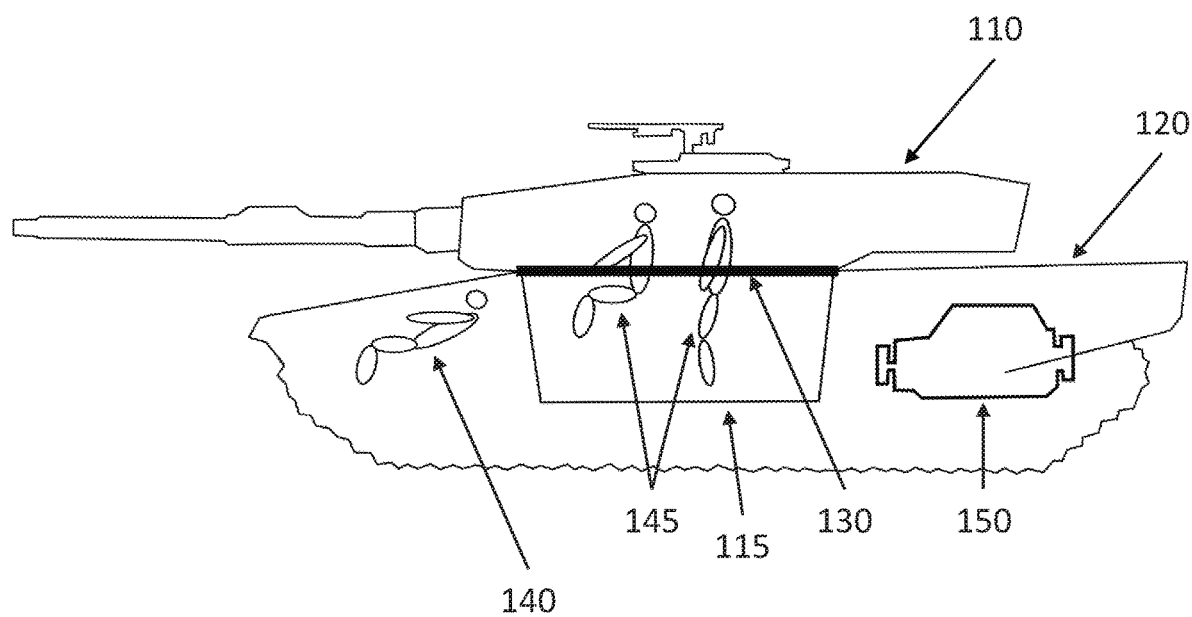
FIG. 1 shows an exemplary vehicle for employing the method and apparatus for communications within a toroidal optical slip ring according to an exemplary embodiment of the disclosure.

FIG. 1 schematically illustrates an exemplary vehicle 100 for employing the method and apparatus for communications within a toroidal optical slip ring according to the present disclosure. The exemplary vehicle 100, such as an armored vehicle, may include a turret 110, a turret basket 115, a hull 120, a turret drive ring 130. The exemplary vehicle 100 may be driven by a driver 140 with additional crew members 145 in the turret basket 115.

In modern tanks, the turret 110 may house the crew members 145 engaged in command of the vehicle and operation of the weapons and communications systems other than the driver 140 who is typically located in a driver's compartment in the hull 120. The vehicle engine 150 is typically located in an engine compartment in the rear of the hull 120 and is coupled to drive wheels on the exterior of the hull 120 for driving the tracks to move the vehicle 100. The turret 110 is conventionally rotated by the turret drive ring 130 which is a mechanical drive using a toroidal (ring) gear on its circumference and driven by a hull-mounted motor through a spur gear. Alternatively, a turret mounted motor may drive turret rotation and a hull mounted ring gear.

Since electrical power is derived from the operation of the engine 150 and stored in batteries typically located in the hull 120, electric power to power the weapons, communications, targeting systems, and other electronics in the turret must be transmitted between the stationary hull 120 and the rotating turret 110. In addition, communications between the driver and the crew members 145 in the turret 110 and high-speed communications between the turret systems and vehicle drive systems and the like must be enabled. Traditional communications interfaces, such as slip ring assemblies using brushes and electrical contacts have not been able to reliably provide the high-speed communications required for increasing complex modern systems.

Figure 2:
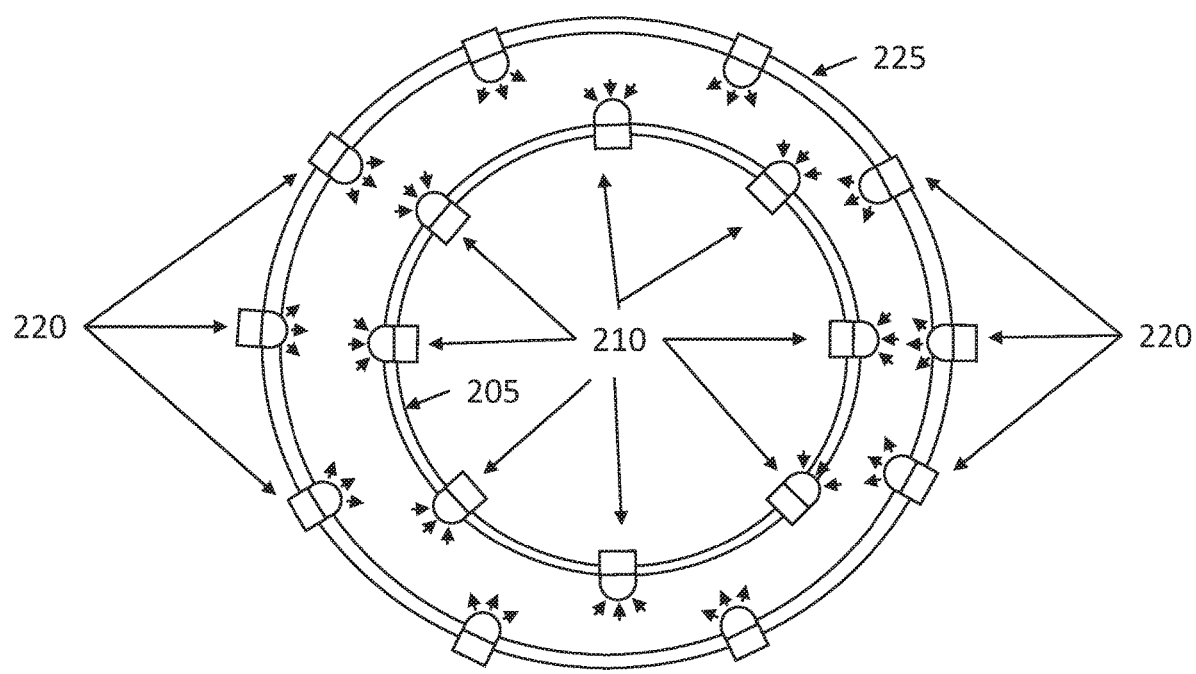
FIG. 2 illustrates an exemplary implementation of a toroidal optical slip ring assembly according to an exemplary embodiment of the disclosure.

Turning now to FIG. 2, a diagram illustrating an exemplary implementation of a toroidal optical slip ring assembly 200 is shown. The exemplary assembly 200 may include and outer ring 225 having a plurality of outer photodiodes 220 and an inner ring 205 having a plurality of inner photodiodes 210. In this exemplary embedment, there is an airgap between the inner ring 205 and the outer ring 225. In a first exemplary embodiment, the toroidal optical slip ring assembly 200 may be located with the turret drive ring assembly near the interface of the upper surface of the vehicle hull and the lower surface of the turret. Alternatively, the toroidal optical slip ring assembly 200 may be mounted to the bottom of a turret basket and a lower, inner portion of the hull. Mounting the toroidal optical slip ring assembly 200 to the bottom of the turret basket would enable the toroidal optical slip ring assembly 200 radius to be adjusted according to design requirements without having to accommodate crew members and equipment within the inner portion of the toroidal optical slip ring assembly 200.

In one exemplary embodiment, the toroidal optical slip ring assembly 200 may include photodiodes 210, 220 configured as emitters and detectors for communicating information via light across the air gap. The air gap may be within a diffusely reflective cavity between the inner ring 205, which may be mounted to a vehicle turret, and the outer ring 225 which may be mounted to the hull of the vehicle. The communications link is maintained throughout rotation by driving multiple emitters with the same signal and summing the received light on multiple detectors. A full duplex communication system may be implemented using a mix of emitters and detectors on each side of the air gap utilizing time multiplexing or wavelength separation filters or may use two separate rings with each separate ring having only emitters on one side and detectors on the other side. Implementation may include drive and detection electronics to create a transparent link with a standard interface protocol such as 100Base-T or universal serial bus (USB). An advantage of optical communications in a military vehicle or military application is that the communications are resistant to interference from intense local magnetic and radio frequency fields.

Signal amplitude of the transmitted communications signal may vary somewhat with rotation depending upon the number of emitters and detectors, spatial response patterns and the dimensions of the air gap. In one exemplary embodiment detector automatic gain, digital coding, such as transition level detection, and carrier modulation using frequency or phase may be used to compensate for amplitude fluctuation. In addition, dynamic selection of specific emitter detector pairs may be made based upon signal strength or adjustment of emitter power using feedback from the detectors. If net amplitude variation is small due to physical design, simple threshold level detection may be sufficient.

Depending upon the spacing and response patterns of emitters and detectors, any single detector may receive light from several emitters. This "multipath" effect may result in altering time delays at each detector and could smear signal edges to limit the maximum transmission rate. For practical dimensions, multipath may not be significant since the gap is short and the speed of light is high. Assuming a path uncertainty of 0.1 m and the −3 dB bandwidth approximation of [0.35/risetime], a multipath-limited bandwidth of around 1 GHz may be realized.

A realizable bandwidth may be set by the availability of cost-effective emitters and detectors and network speed requirements. Emitters may include LEDs or diode lasers. Selection of detectors, such as photodiodes, may be limited by device construction such as capacitance and material; near-IR types can be faster due to lower junction voltages within the semiconductor material. P-intrinsic-n (PIN) diodes may be faster than single junction types and offer bandwidths from 100 MHz to 10's of GHz.

Spacing of the detectors and emitters along the inner and outer toroidal rings is chosen to ensure that the transmission beam width of at least one emitter is within the reception beam width of at least one detector at all points of rotation around the toroidal ring. The exemplary communications link is configured to employ multiple emitters and multiple detectors spaced around the circumference of the outer surface of the inner ring and the inner surface of the outer ring. The emitters and detectors are coupled such that at least one sightline is available regardless of rotation angle. The number and spacing of devices to ensure continuous coupling depends upon their emission beam width or detection beam width and the gap between the respective emitters and detectors. With a short gap and practical beam spreading optics, many devices may be required. In a first exemplary embodiment, emitters may be spaced around the first ring such that their effecting beam widths cover the proximate surface of the second ring. Detectors may be positions along the proximate surface of the second ring such that alternating detectors are positioned opposite a center of an emitter beam width and opposite a junction of two neighboring emitter beam widths. In this configuration, at least half of the detectors are centered on an emitter beam width, thus a position of highest amplitude, when half of the detectors are positioned at a junction of two emitter beam widths, a position of lowest amplitude. While this example of spacing of emitters and detectors may ensure a continuous alignment of emitters and detectors, it may result in a large number of superfluous or redundant emitters and detectors and not be the most efficient configuration.

In an alternative embodiment, the emitters and detectors may be spaced according to a Vernier pattern where a larger number of detectors are used with a smaller number of transmitters. In this example, a smaller number of emitters, such as three emitters, may be equally spaced on an inner ring with an outer ring having a larger number of equally spaced detectors, such as 16 detectors. In this example, one of the emitters is aligned with one of the detectors every ¼ of a 1/16 increment of rotation. Thus, an emitter is directly aligned with a detector every 1/64 of a rotation. If the beam width of the emitter and the detector are wide enough to couple a signal of sufficient amplitude, this configuration results in less redundancy of emitters and transmitters and may result in less amplitude variation resulting from simultaneous alignment of multiple emitter transmitters. For example, sixteen evenly spaced emitters and detectors would result in amplitude peaks every 1/16 of a rotation due to all of the emitters and detectors aligning and signal nulls in between the 1/16 rotations due to all of the emitters being centered between detectors. In one example, emitter detector ratios may be selected from a non-integer ratio, such as 16 detectors to 3 emitters or 16 detectors to 5 emitters in order to reduce this amplitude variation. Amplitude variation may result in a limitation of the maximum data rate when finite emitter/detector response times narrow the width of the unambiguous voltage window. In one embodiment, each emitter may couple to several detectors even though the angles between them exceed the specified half-angles wherein each coupling contributes to the received signal resulting from signal summing at the detectors. The overall signal-to-noise ratio may be improved by this arrangement as long as the summed noise from weakly linked detectors is low and uncorrelated.

Figure 3:
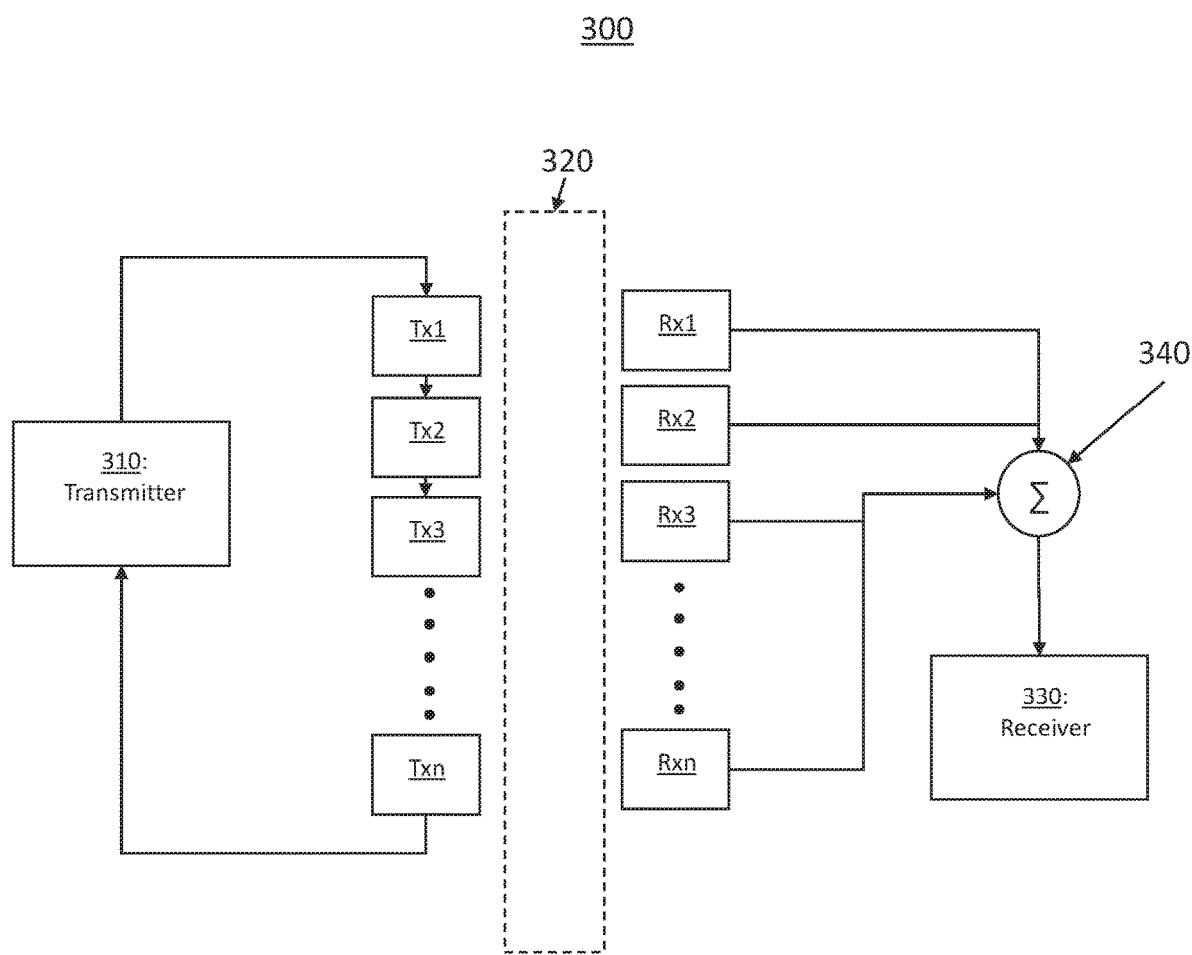
FIG. 3 shows a block diagram illustrating an exemplary implementation of a system for optical slip ring communications according to an exemplary embodiment of the disclosure.

Turning now to FIG. 3, a block diagram illustrating an exemplary implementation of a system 300 for optical slip ring communications is shown. The exemplary system 300 may include a transmitter 310, a summer 340, a receiver 330, a plurality of emitters Tx1, Tx2, Tx3 . . . Txn, and a plurality of detectors Rx1, Rx2, Rx3 . . . Rxn. The exemplary system is configured to transmit data between a first portion of an optical slip ring to a second portion of an optical slip ring across an air gap 320.

The transmitter 310 is configured to receive data from a number of systems, to organize the received data into a single data transmission stream and to format the data transmission stream according to a standard interface protocol such as 100Base-T or universal serial bus (USB). The transmitter may be a digital signal processor, a network processor, or other processing computer or device configured to format the received data into a packet data format or the like for transmission via a transmission channel, such as a visible light communications (VLC) channel. For example, the transmitter 310 may be configured to generate packet data and modulate this data according to pulse width modulation (PWM), amplitude modulation (AM) frequency modulation (FM) or other suitable optical modulation format to generate a modulated data signal.

The modulated data signal is then coupled to a series connection of a plurality emitters Tx1, Tx2, Tx3, . . . Txn. In this configuration, each of the plurality of emitters Tx1, Tx2, Tx3, . . . Txn, nearly simultaneously convert the modulated data signal to optical energy and radiate a corresponding optical signal into the air gap 320. The optical energy is then detected by at least one of a plurality of detectors Rx1, Rx2, Rx3 . . . Rxn and converted to an electrical signal by the detector. The detectors Rx1, Rx2, Rx3 . . . Rxn may be photo diodes, photovoltaics, phototransistors, optical switches or other optical sensors or switches. In this exemplary embodiment, the resulting electrical signals from each of the detectors Rx1, Rx2, Rx3 . . . Rxn are then coupled to a summer 340. The signals from each of the detectors Rx1, Rx2, Rx3 . . . Rxn are then summed to generate a combined received signal. The combined received signal is then coupled to a receiver 330 for demodulation and extraction of the transmitted data.

In this exemplary embodiment, since the distances between devices and across the air gap is relatively small, and the data rate of the transmitted data is relatively slow compared to the speed of light, the time delay resulting from serial transmission of the optical signal by the emitters Tx1, Tx2, Tx3 . . . Txn and parallel reception by the detectors Rx1, Rx2, Rx3 . . . Rxn is negligible and does not affect the quality of the received signal. The parallel configuration of the emitters Tx1, Tx2, Tx3 . . . Txn is advantageous as it enables a constant transmission signal among the emitters Tx1, Tx2, Tx3 . . . Txn. The parallel reception of the received signals is advantageous as it allows for the summing of all received signals from each of the detectors Rx1, Rx2, Rx3 . . . Rxn without a degradation of the amplitude of any of the individual received signals. In an exemplary embodiment, the plurality of optical emitters Tx1, Tx2, Tx3 . . . Txn may be equally spaced around the inner surface of an outer ring of the optical slip ring and a plurality of detectors are equally spaced around the outer surface of the inner ring of the optical slip ring such that a portion of a beam width of at least one of the detectors Rx1, Rx2, Rx3 . . . Rxn is within a portion of a beam width of at least one of the optical emitters Tx1, Tx2, Tx3 . . . Txn.

Figure 4:
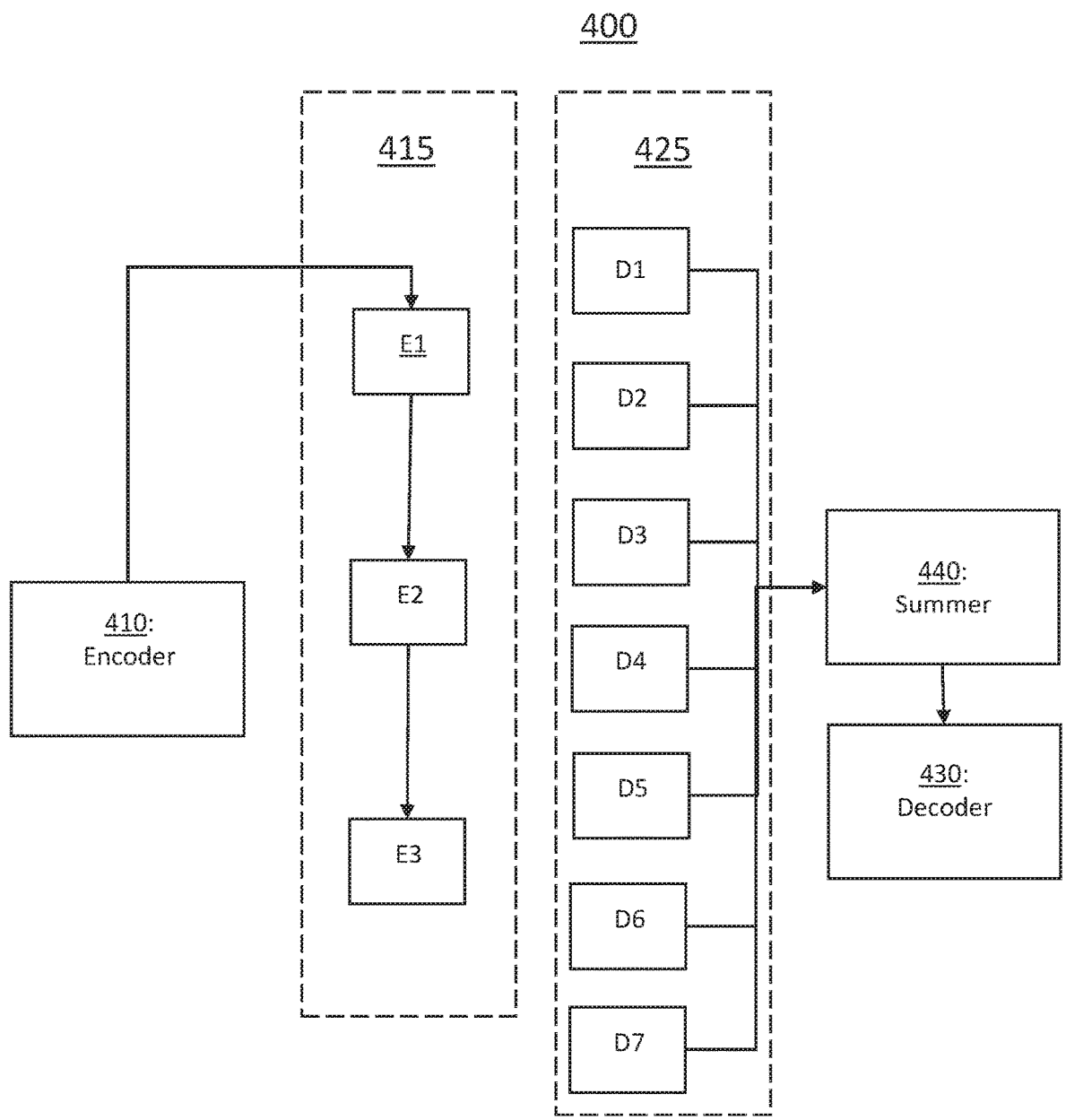
FIG. 4 shows a block diagram illustrating another exemplary implementation of a system for toroidal optical slip ring communications according to another exemplary embodiment of the disclosure.

Turning now to FIG. 4, a block diagram illustrating another exemplary implementation of a system 400 for toroidal optical slip ring communications is shown. The exemplary system 400 may include an encoder 410, a first emitter E1, a second emitter E2 and a third emitter E3, a first detector D1, a second detector D2, a third detector D3 a fourth detector D4, a fifth detector D5, a sixth detector D6, a seventh detector D7, a summer 440 and a decoder 430.

In this exemplary embodiment, a communications system is shown for optical communications between an outer ring 415 of a slip ring and an inner ring 425 of the slip ring. In this example, the outer ring 415 being oriented in a first plane having an inner surface. In this example, the inner ring 425 may be rotated with respect to the outer ring 415 and has a plane of rotation parallel to the first plane. Alternatively, the outer ring 415 may be rotated with the inner ring 425 position being static. A plurality of optical emitters, or transmitters, may be disposed on the inner surface of the outer ring 415 and oriented parallel to the first plane to transmit a transmission signal across the gap toward a focus of the outer ring 415. The focus of the outer ring 415 is the center of the ring in the plane of the ring. In this exemplary embodiment, a first emitter E1, a second emitter E2 and a third emitter E3 are disposed around the inner surface of the outer ring 415 at 120 degree intervals. In an exemplary application, the inner ring 425 may form a portion of a rotor coupled to a turret of an armored vehicle and the outer ring 415 may form a portion of a stator coupled to a vehicle hull wherein the rotor and stator are configured to rotate the turret with respect to the vehicle hull.

The communications system further includes an inner ring 425 oriented in the first plane having an outer surface and positioned within the outer ring 415 such that the inner surface and the outer surface are separated by a gap. In one exemplary embodiment, the gap may be an air gap. Alternatively, the gap may be a sealed gap filled with a gas or vacuum to improve propagation and/or reflection of transmitted light. The system 400 may further include a plurality of detectors disposed on the outer surface of the inner ring 425. The plurality of detectors may be oriented parallel to the first plane to receive the transmission signal transmitted across the gap toward a focus of the inner ring and to generate a plurality of representations of the transmission signal. In this exemplary embodiment, seven detectors D1, D2, D3, D4, D5, D6, D7 are disposed on the outer surface of the inner ring 425 at regular intervals. For example, the seven detectors D1, D2, D3, D4, D5, D6, D7 may be positioned at approximately 52-degree intervals. In this exemplary embodiment, one of the three emitters E1, E2, E3 is aligned with one of the seven detectors D1, D2, D3, D4, D5, D6, D7 every 17 degrees of rotation of the inner ring 425. Any number of emitters and/or detectors may be used dependent on design criteria, size of the gap between the inner and outer surfaces, and size of the inner 425 and outer ring 415 according to the teachings of the present disclosure. However, to reduce the variation of amplitude at the summer 440, a ratio of optical emitters to detectors should be selected as a non-integer ratio.

The exemplary system further includes an encoder 410 configured to receive a data signal, to modulate the data signal, to generate the transmission signal and to couple the transmission signal to the emitters E1, E2, E3. In one exemplary embodiment, the transmission signal may be transmitted via a pulse width modulated optical signal. The transmission signal is coupled first to the first emitter E1, then to the second emitter E2 and then to the third emitter E3 wherein the three emitters E1, E2, E3 are coupled in a series configuration. In a first exemplary embodiment, the emitters E1, E2, E3 may be light emitting diodes and the plurality of detectors D1, D2, D3, D4, D5, D6, D7 are photodiodes.

The summer 440 is configured to receive a plurality of representations of the transmission signal from each of the plurality of detectors D1, D2, D3, D4, D5, D6, D7 and generate a summed transmission signal in response to a sum of the plurality of representations of the transmission signals. The representations of the transmission signals are the received transmission signals transmitted by each of the emitters E1, E2, E3. Each of these representations of the received transmission signals may have different amplitudes, slightly different phases, and the like due to propagation between an emitter and the respective detector as well as positioning of the emitter and detector at the time of transmission.

The exemplary system 400 may further include a decoder 430 for receiving the summed transmission signal from the summer 440 and demodulating the summed transmission signal to extract the data. This data may then be coupled to other vehicle systems, such as communications systems, sensor systems, user interfaces, drive and propulsion systems, weapons systems or the like.

In an exemplary embodiment, the system 400 may be a communications system for transmitting a data between a vehicle turret and a vehicle hull of an armored vehicle including an outer ring 415 having an inner surface, an inner ring 525 having an outer surface wherein the inner ring 425 is positioned within the outer ring 415 and wherein the inner surface and the outer surface are separated by an air gap. A plurality of optical emitters E1, E2, E3, may be disposed on the outer surface of the inner ring 425 wherein each of the plurality of optical emitters E1, E2, E3, may be oriented to have a beam width centered away from the focus of the inner ring 425 and to transmit a transmission signal towards the inner surface. A plurality of detectors D1, D2, D3, D4, D5, D6, D7 may be disposed on the inner surface wherein each of the plurality of detectors is oriented to have a beam width centered towards the focus of the outer ring 415 wherein each of the plurality of detectors is configured to receive one of a plurality of representations of the transmission signal. The exemplary system may further include an encoder 410, or transmitter, coupled in series to the plurality of optical emitters E1, E2, E3 to generate a transmission signal in response to the data. A summer 440 may also be configured for generating a summed transmission signal in response to the plurality of representations of the transmission signal with a decoder 430 configured for extracting the data from the summed transmission signal and coupling the data to a vehicle data processor or the like. In one embodiment, the outer ring 415 is coupled to an interior portion of the hull and the inner ring 425 is coupled to a turret basket affixed to the turret.

Figure 5:
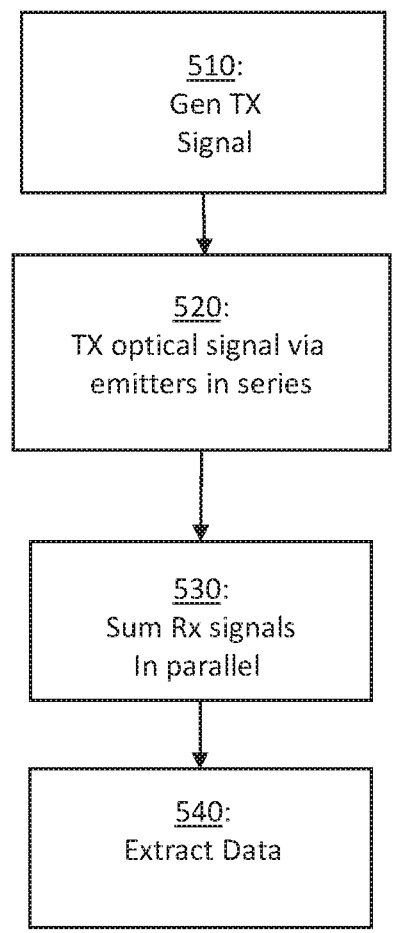
FIG. 5 shows a flow chart illustrating an exemplary implementation of a method for toroidal optical slip ring communications according to another exemplary embodiment of the disclosure.

Turning now to FIG. 5, a flow chart illustrating an exemplary implementation of a method 500 for toroidal optical slip ring communications is shown. The exemplary method 500 configured for transmitting a data signal between a stator ring and a rotor ring. In one embodiment, the stator ring and rotor ring are configured for rotating a turret with respect to a vehicle hull.

The method is first configured for generating 510 a transmission signal in response to receiving the data signal. In an exemplary embodiment, the rotator ring may be positioned within the stator ring such that the inner surface faces the outer surface. The transmission signal may be generated by a transmitter configured to generate a modulated signal, such as a pulse width modulated signal, in response to data received from other systems for transmission across the optical slip ring.

The method is next operative for transmitting 520 the transmission signal to a plurality of detectors coupled to an outer surface of the rotor. The transmission signal may be transmitted by a plurality of optical transmitters coupled to an inner surface of the stator ring where the optical transmitters are configured to transmit the transmission signal towards a focus of the stator ring. In one exemplary embodiment, the transmitters may be light emitting diodes and the detectors are photodiodes. Alternatively, the transmitters may be laser diodes or the like. The transmitters may be configured in series with the transmitter and wherein the transmission signal may be coupled to the plurality of optical transmitters in series.

The method is next operative for summing 530 a plurality of representations of the transmission signal received by each of the plurality of detectors to generate a summed transmission signal. Each detector may generate a different representation of the transmitted signal having varying amplitudes. In this embodiment, the plurality of representations of the transmission signal are coupled to the summer in parallel.

The method is then configured for extracting 540 the data signal from the summed transmission signal. The data signal may be extracted using a demodulator, receiver, or decoder. The extracted data signal may then be coupled to other vehicle systems via a vehicle network, such as a controller area network bus or the like.

In one exemplary embodiment, the plurality of optical transmitters are equally spaced around the inner surface and the plurality of detectors are equally spaced around the outer surface such that a portion of a beam width of at least one of the detectors is within a portion of a beam width of at least one of the optical transmitters. For example, the plurality of optical transmitters are spaced along the inner surface at a constant fraction of a spacing of the detectors along the outer surface according to a Vernier principle. The transmission signal may be optically coupled across an air gap between the inner surface and the outer surface.

While at least one exemplary embodiment has been presented in the foregoing detailed description, it should be appreciated that a vast number of variations exist. For example, the disclosed systems and methods may be employed on any systems where the rotational axis for an apparatus must remain open, such as whole-body medical tomography. In employing the exemplary system, one portion of the toroidal slip ring may be continuously rotated around the orthogonal axis. It should be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A communications system comprising:
    an outer ring oriented in a first plane having an inner surface;
    an inner ring oriented in the first plane having an outer surface and positioned within the outer ring such that the inner surface and the outer surface are separated by a gap wherein the inner ring forms a portion of a rotor coupled to a turret and the outer ring forms a portion of a stator coupled to a vehicle hull wherein the rotor and stator are further configured to rotate the turret with respect to the vehicle hull;
    a plurality of optical transmitters disposed on the inner surface, the plurality of transmitters oriented parallel to the first plane to transmit a transmission signal across the gap toward a focus of the outer ring;
    a plurality of detectors disposed on the outer surface, the plurality of detectors oriented parallel to the first plane to receive the transmission signal transmitted across the gap and to generate a plurality of representations of the transmission signal wherein a ratio of optical transmitters to detectors is a non-integer ratio;
    a transmitter configured to receive a data signal, to modulate the data signal to generate the transmission signal and to couple the transmission signal to the plurality of optical transmitters;
    a summer configured to sum the plurality of representations of the transmission signal from each of the plurality of detectors and generate a summed transmission signal in response to the sum of the plurality of representations of the transmission signals; and
    a receiver operative to extract the data signal from the summed transmission signal and to couple the data signal to a data processing device.

2. The communications system of claim 1 wherein the plurality of optical transmitters are light emitting diodes and the plurality of detectors are photodiodes.

3. The communications system of claim 1 wherein the plurality of optical transmitters are laser diodes.

4. The communications system of claim 1 wherein the inner ring may be rotated with respect to the outer ring and has a plane of rotation parallel to the first plane.

5. The communications system of claim 1 wherein the transmission signal is transmitted via a pulse width modulated optical signal.

6. The communications system of claim 1 wherein the plurality of optical transmitters are equally spaced around the inner surface and the plurality of detectors are equally spaced around the outer surface such that a portion of a beam width of at least one of the detectors is within a portion of a beam width of at least one of the optical transmitters.

7. The communications system of claim 1 wherein the detectors are spaced along the outer surface according to a Vernier principle.

8. A method for transmitting a data signal between a stator ring and a rotor ring comprising:
    generating, by a transmitter, a transmission signal in response to receiving the data signal;

transmitting, by a plurality of optical transmitters coupled to an inner surface of the stator ring, the transmission signal to a plurality of detectors coupled to an outer surface of the rotor and wherein the optical transmitters are configured to transmit the transmission signal towards a focus of the stator ring wherein the rotor ring is coupled to a turret and the stator ring is coupled to a vehicle hull wherein the rotor ring and the stator ring are further configured to rotate the turret with respect to the vehicle hull;

summing a plurality of representations of the transmission signal received by each of the plurality of detectors to generate a summed transmission signal wherein a ratio of optical transmitters to detectors is a non-integer ratio; and extracting, by a receiver, the data signal from the summed transmission signal.

9. The method for transmitting a data signal between a stator ring and a rotor ring of claim 8 wherein the rotor rotator ring is positioned within the stator ring such that the inner surface faces the outer surface.

10. The method for transmitting a data signal between a stator ring and a rotor ring of claim 8 wherein the plurality of optical transmitters are light emitting diodes and the plurality of detectors are photodiodes.

11. The method for transmitting a data signal between a stator ring and a rotor ring of claim 8 wherein the transmission signal is transmitted via a pulse width modulated signal.

12. The method for transmitting a data signal between a stator ring and a rotor ring of claim 8 wherein the plurality of optical transmitters are coupled in series with the transmitter and wherein the transmission signal is coupled to the plurality of optical transmitters in series.

13. The method for transmitting a data signal between a stator ring and a rotor ring of claim 8 wherein the plurality of representations of the transmission signal are coupled to a summer in parallel.

14. The method for transmitting a data signal between a stator ring and a rotor ring of claim 8 where the stator ring and the rotor ring are configured for rotating a turret with respect to a vehicle hull.

15. The method for transmitting a data signal between a stator ring and a rotor ring of claim 8 wherein the plurality of optical transmitters are equally spaced around the inner surface and the plurality of detectors are equally spaced around the outer surface such that a portion of a beam width of at least one of the detectors is within a portion of a beam width of at least one of the optical transmitters.

16. The method for transmitting a data signal between a stator ring and a rotor ring of claim 8 wherein the transmission signal is optically coupled across an air gap between the inner surface and the outer surface.

17. The method for transmitting a data signal between a stator ring and a rotor ring of claim 8 wherein the plurality of optical transmitters are spaced along the inner surface at a constant fraction of a spacing and of the detectors are spaced along the outer surface according to a Vernier principle.

18. A communications system for transmitting a data between a turret and a hull comprising:

an outer ring having an inner surface;

an inner ring having an outer surface wherein the inner ring is positioned within the outer ring and wherein the inner surface and the outer surface are separated by an air gap;

a plurality of optical transmitters disposed on the outer surface wherein each of the plurality of optical transmitters is oriented to have a beam width centered away from a focus of the inner ring, the plurality of optical transmitters further configured to transmit a transmission signal towards the inner surface wherein the inner ring forms a portion of a rotor coupled to the turret and the outer ring forms a portion of a stator coupled to the hull wherein the rotor and stator are further configured to rotate the turret with respect to the hull;

a plurality of detectors disposed on the inner surface wherein each of the plurality of detectors is oriented to have a beam width centered towards the focus of the outer ring wherein each of the plurality of detectors is configured to receive at least one of a plurality of representations of the transmission signal;

a transmitter coupled in series to the plurality of optical transmitters, the transmitter being further operative to generate a transmission signal in response to the data;

a summer configured for generating a summed transmission signal in response to the plurality of representations of the transmission signal; and a receiver configured for extracting the data from the summed transmission signal and coupling the data to a vehicle data processor.

19. The communications system for transmitting the data between the turret and the hull of claim 18 where the plurality of detectors are spaced along the inner surface according to a Vernier principle.

* * * * *